(No Model.) 2 Sheets—Sheet 1.

H. NEBBE.
STUBBLE CATCHER.

No. 591,873. Patented Oct. 19, 1897.

WITNESSES
V. J. Evans.
Earl Oberlin.

INVENTOR,
HANS NEBBE,
by John Wedderburn
Attorney

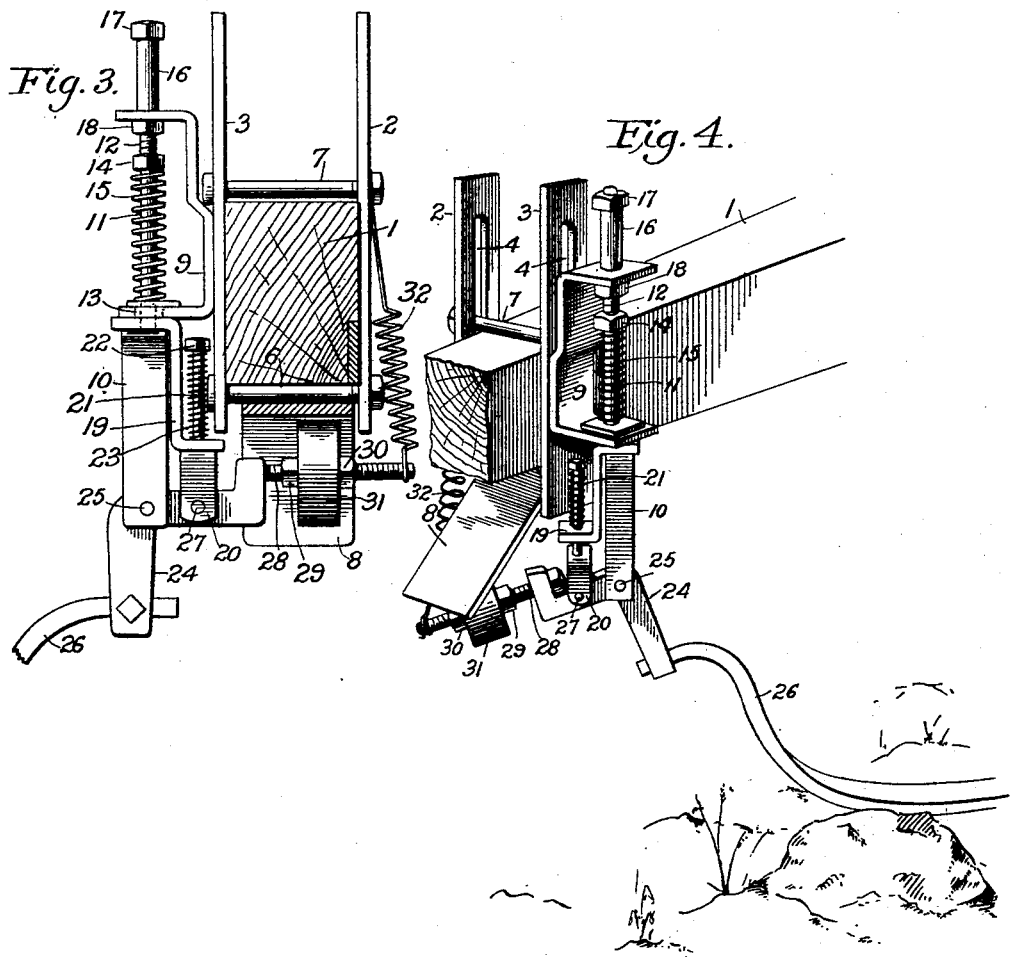

UNITED STATES PATENT OFFICE.

HANS NEBBE, OF FAIRMONT, MINNESOTA.

STUBBLE-CATCHER.

SPECIFICATION forming part of Letters Patent No. 591,873, dated October 19, 1897.

Application filed November 19, 1896. Serial No. 612,750. (No model.)

*To all whom it may concern:*

Be it known that I, HANS NEBBE, a citizen of the United States, residing at Fairmont, in the county of Martin and State of Minnesota, have invented certain new and useful Improvements in Stubble-Catchers; and I do hereby declare the following to be a full, clear, and exact description of the invention, such as will enable others skilled in the art to which it appertains to make and use the same.

My invention relates to stubble-catchers adapted for attachment to a plow and to remove from the path thereof stubble and other light foreign material. Heretofore stubble-catchers have been for the most part formed rigid, so that when striking an obstruction they are liable to bend or break with a consequent impairing of their efficiency.

My object is to provide a novel form of stubble-catcher which will be adapted to more satisfactorily remove the stubble and other light foreign material but will comprise such a combination of novel features that when an obstacle is struck the parts will give and the obstacle will be safely passed without any resulting damage.

Having this object in view, my invention consists of a novel form of stubble-catcher comprising certain improved features and combinations appearing more in detail hereinafter.

Figure 1:
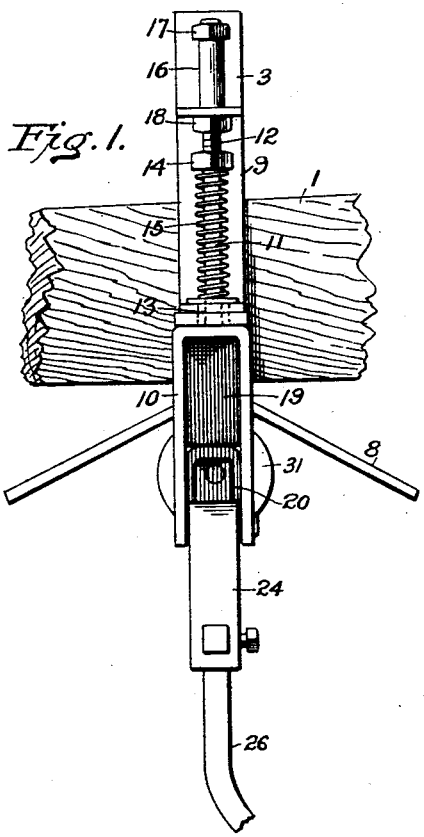
Figure 2:
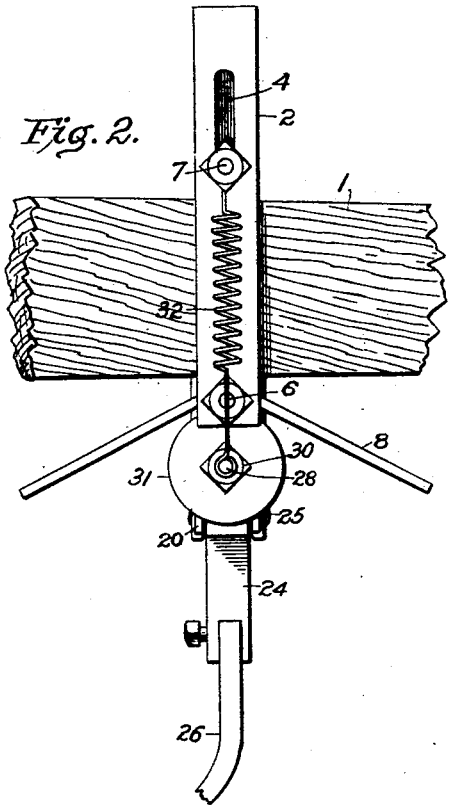

In the accompanying drawings, Figures 1 and 2 are side elevations, Fig. 3 a rear view, and Fig. 4 a perspective view showing the movements of the parts.

The numeral 1 designates a plow-beam.

At 2 and 3 are shown plates or bars, each of which is provided with a slot 4. These bars are located on opposite sides of the plow-beam near the clevis thereof and their lower ends are connected by a bolt 6.

The numeral 7 designates a second bolt, which has its shank passed through the slot. It will thus be seen that provision is made for the application of the device to a plow-beam of any dimensions.

At 8 there is shown a cam-track which is made up of two inclined portions that converge upwardly. Said cam-track is secured in position by the lower bolt that connects the bars.

At 9 there is shown a bracket which is of substantial U shape and is secured to one of the bars.

The numeral 10 designates a vertically-extending fork, and formed integral with or connected to the upper portion of said fork is a rod 11, which has a screw-threaded upper end 12. There is a socket 13, which is seated in the lower portion of the U-shaped bracket and receives the rod just described, so that said rod can be moved vertically. On the screw-threaded portion of the rod there is an adjusting-nut 14, and interposed between said adjusting-nut and the socket is a coil-spring 15. Encircling the upper or screw-threaded portion of the rod is a sleeve 16, which is adapted to slide freely through the upper arm of the bracket. Said sleeve is prevented from slipping down by two nuts 17 and 18. There is another bracket, which is designated by the numeral 19, said bracket being made in the shape of the letter Z, and the rod 11 passes loosely through the upper projecting piece of said bracket.

At 20 is shown a smaller or auxiliary fork, which is provided with a screw-threaded rod or stem 21, which passes loosely through the remaining projection of the Z-shaped bracket. On the upper end of said rod there is located an adjusting-nut 22, and interposed between the said adjusting-nut and the bracket is a coil-spring 23.

The numeral 24 designates a catcher-arm which is made in the shape of a bell-crank lever, its bend being received in the main fork and pivoted on a bolt or pin 25. One arm of the bell-crank lever projects downwardly and is connected to the catcher 26. The other arm of said lever is received in the auxiliary fork and is pivoted thereto on a pin or bolt 27.

The numeral 28 designates a screw-threaded bolt which is screwed into the horizontally-extending arm of the bell-crank lever and carries the two nuts 29 and 30. A roller 31 is journaled on the bolt and located between the nut 30 and the head of the bolt. This roller is adapted to travel in the track.

The numeral 32 designates a coil-spring which connects a bolt with one of the upright bars at the side of the plow-beam and exerts a tendency to hold the roller at the highest point of the track.

The tension of the different springs is such that the catcher is adapted to receive and remove any stubble or other light foreign material. When, however, it strikes a large or heavy obstruction, the main fork turns horizontally and the roller by its engagement with the track causes the auxiliary fork to be pulled downwardly, and hence the catcher is simultaneously turned to the rear and elevated and the obstacle safely passed. After this the tension of the spring that actuates the auxiliary fork, when taken in connection with the power exerted by the spring 32, causes the roller to again rise to the highest point of the track.

Having thus described my invention, what I claim as new, and desire to secure by Letters Patent, is—

1. In a stubble-catcher, the combination with an arm pivoted to swing vertically and horizontally, of a catcher carried thereby, a roller carried by the arm, and a track comprising converging portions over which the roller is adapted to ride.

2. In a stubble-catcher, the combination with an arm pivoted to swing both horizontally and vertically, of a catcher carried thereby, a track, a roller carried by the arm which is adapted to ride on the track, and a spring adapted to draw the roller end of the arm upward and keep it in engagement with the track.

3. In a stubble-catcher, the combination with a vertically-movable rod, of a spring adapted to keep the same upwardly retracted, an arm pivoted to the rod, a catcher connected to the arm, a pivoted bracket, a second vertically-movable rod, a spring for upwardly retracting the same, and a track with which the arm is adapted to engage.

4. In a stubble-catcher, the combination with a vertically-movable spring-retracted rod pivoted to turn horizontally, of a bracket pivoted on the rod, a second upwardly-spring-retracted rod, movable through the bracket, an arm pivoted to both the rods, a catcher carried by said arm, a roller also carried by the arm, and a track on which the roller rides.

In testimony whereof I have signed this specification in the presence of two subscribing witnesses.

HANS NEBBE.

Witnesses:
J. B. FRAZIER,
J. H. GORMAN.